United States Patent
Leenstra et al.

(10) Patent No.: US 6,725,332 B2
(45) Date of Patent: Apr. 20, 2004

(54) HIERARCHICAL PRIORITY FILTER WITH INTEGRATED SERIALIZATION FOR DETERMINING THE ENTRY WITH THE HIGHEST PRIORITY IN A BUFFER MEMORY

(75) Inventors: Jens Leenstra, Bondorf (DE); Antje Mueller, Boeblingen (DE); Juergen Pille, Stuttgart (DE); Dieter Wendel, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 09/681,346

(22) Filed: Mar. 22, 2001

(65) Prior Publication Data

US 2001/0029557 A1 Oct. 11, 2001

(30) Foreign Application Priority Data

Mar. 29, 2000 (EP) .......................................... 00106674

(51) Int. Cl.[7] .............................................. G06F 12/00
(52) U.S. Cl. ........................ 711/117; 710/40; 710/42; 711/122; 709/103
(58) Field of Search ................ 710/42, 40; 709/103; 711/117, 122

(56) References Cited

U.S. PATENT DOCUMENTS

| 5,521,916 | A | * | 5/1996 | Choudhury et al. | ........ 370/414 |
| 5,557,754 | A | * | 9/1996 | Sone et al. | .................. 710/107 |
| 5,574,505 | A | * | 11/1996 | Lyons et al. | ........... 375/240.26 |
| 5,694,553 | A | * | 12/1997 | Abramson et al. | ............ 712/23 |
| 5,923,900 | A |  | 7/1999 | Soell et al. | .................. 395/860 |

* cited by examiner

*Primary Examiner*—Jeffrey Gaffin
*Assistant Examiner*—Justin Knapp
(74) *Attorney, Agent, or Firm*—Ido Tuchman; Derek Jennings (57) ABSTRACT

A storage device and a method for determining the entry with the highest priority in a buffer memory. The method is characterized by the steps of operating a plurality of priority subfilter circuits each of them covering a disjunct subgroup of the total of entries and each selecting the entry with the highest subgroup priority, and selecting the entry associated with the highest priority subgroup. The storage device is able to be allocated and deallocated repeatedly during processing program instructions in a computer system. The storage device is further characterized by an operator for operating a plurality of priority subfilter circuits. Each of priority subfilter circuits covers a disjunct subgroup of the total of entries and each selecting the entry with the highest subgroup priority. The storage device is still further characterized by a selector for selecting the entry associated with the highest priority subgroup.

15 Claims, 6 Drawing Sheets

HIERARCHICAL PRIORITY FILTER WITH INTEGRATED SERIALIZATION FOR DETERMINING THE ENTRY WITH THE HIGHEST PRIORITY IN A BUFFER MEMORY

FIELD OF THE INVENTION

The present invention relates to storage devices in computer systems and in particular, it relates to an improved method and system for operating system storage devices, and in particular to buffer devices which are used in the processor in a circulating manner.

BACKGROUND OF THE INVENTION

Although the present invention has a broad field of application as improving or optimizing storage strategies is a very general purpose in computer technology and in particular in system architecture, it will be described and discussed with prior art technology in a special field of application, namely, in the context of operating a so-called instruction window buffer, (also called reservation station/reorder buffer in literature) further referred to and abbreviated as IWB herein, which is usually present in most modern computer systems in order to enable a parallel program processing of instructions by a plurality of processing units. Such processors are referred to herein as out-of-order processors.

In many modern out-of-order processors, IWB is used to contain all the instructions and/or register contents before the calculated results are committed. During commitment the IWB entry is cleaned and may be overwritten by a new instruction. When results were calculated speculatively beyond the outcome of a branch instruction, they can be rejected once the branch prediction becomes wrong just by simply cleaning these entries from the buffer and overwriting them with new correct instructions. This is one prerequisite for the out-of-order processing.

Often such buffers have 32, 62 or 128 entries defining a sequence between them. They are commonly used in a circulating way as a so-called wrap-around buffer where a sequence of valid entries overlaps the end of the buffer and continues with the beginning of it, i.e., wraps around its end to the beginning of the buffer.

One main parameter influencing the performance of the processors is the buffer size. A big buffer can contain many more instructions and results and therefore allows more out-of-order processing. This however stays in conflict with other design requirements such as cycle time, buffer area, etc. When, for example, the buffer size is dimensioned too large then the efforts required to manage a such large plurality of storage locations decreases the performance of said buffer. Often, such buffers are operated according to the FIFO principle: the first entry stored is the first to be put out for further processing.

In particular and with special reference to the present invention, a post-connected priority filter is used in prior art for finding the oldest entry which is ready for execution in the buffer for executing it next. This is necessary because the region in the buffer representing the sequence of valid entries to be operated on is not fixed to a constant array position during operation. The region can be symbolically compared to a worm. It consists of one piece without gaps between the entries, it moves, contracts, or expands during operation.

A prior art instruction window buffer as it is disclosed in U.S. Pat. No. 5,923,900, "Circular Buffer With N Sequential Real And Virtual Entry Positions For Selectively Inhibiting N Adjacent Entry Positions Including The Virtual Entry Position", incorporated herein by reference, is operated according to the following schemes. In order to manage the queue of instructions, the instructions are written in sequence into the buffer during the dispatch phase, further, they are executed out-of-order-issue phase—and written back into architectural registers in sequence again—commit phase. When all source data is available for it an instruction becomes executable which is indicated by a valid bit vb. Several instructions can be valid at a time, one, i.e. the oldest is selected by a priority filter referred to as instruction filter and abbreviated as if, and the data is sent to the instruction execution unit ieu. After the execution is completed the valid bit is overwritten by an execution bit ebn, the active state set to low, so that the next valid instruction can be selected. As an alternative the valid bit vb could be turned off after the data has been sent to the execution unit, instead of having an execution bit.

The prior art circular buffer has an "active" window. Entries outside the window are ignored. This is done e.g., when the active window bit awb overwrites the valid bit vb to zero at the filter input. In the normal mode—in contrast to wrap-around mode—the next entry to be written has a higher number entry than the oldest entry in the active window. In wrap-around mode this is reversed. To handle both cases the filter searches the so-called unfolded data vector vb(0:127), whereby vb(0:63) is duplicated to vb(64:127). This virtual vector lets the oldest entry always have the lowest entry number in normal and wrap-around mode.

Focusing on the problem of the prior art, an architectural decision to increase the size of the window buffer would increase the probability of having a valid instruction in the active window, but also increases the size of the above mentioned priority filter which has to search the duplicated, i.e., unfolded data space when the wrap-around case must be covered. The filter itself becomes the performance limiting element when the IWB excesses a certain size. Thus, a great step forward to larger IWB memories requires a different technique for the priority filter for increasing the overall performance of instruction processing.

SUMMARY OF THE INVENTION

Briefly, a first feature of the invention comprises a method for determining the entry with the highest priority in a buffer memory. The method is characterized by the steps of operating a plurality of priority subfilter circuits each of them covering a disjunct subgroup of the total of entries and each selecting the entry with the highest subgroup priority, and selecting the entry associated with the highest priority subgroup.

Another feature of the invention requires a storage device which is able to be allocated and deallocated repeatedly during processing program instructions in a computer system. The storage device is characterized by an operator for operating a plurality of priority subfilter circuits each of them covering a disjunct subgroup of the total of entries and each selecting the entry with the highest subgroup priority, and a selector for selecting the entry associated with the highest priority subgroup.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENTS

According to the basic principles of the present invention a new hierarchical priority filter scheme is proposed using small and fast 'subfilters' each working on a predetermined disjunct sub space of buffer entries only. Each of the subfilters determines the oldest entry. The 'OR'ing of the filter inputs done in parallel to said determination generates an additional output signal that enables to select the absolute oldest entry in a simple post-connected select logic. The overall filter circuit is small in implementation area and much faster compared to a single filter circuit which covers all entries.

Further, a remarkable contribution to performance gain and area saving is the fact that the additional 'OR' stages are easy to implement. The OR stages are implemented as an integrated part of the total subfilter by using a dynamic OR structure. The inputs of a dynamic OR are the respective subspaces of the filter entries.

Additionally, as such an OR-stage is in parallel to the filter itself it has a neglectable load or a delay impact. Thus the window buffer can be further increased without being limited by priority filter performance.

In case of supporting the wrap-around operation feature of the buffer the inventional concepts include to introduce a second arrangement or group of 'OR' stages which are used in the wrap-around case as described further above, i.e., in case of a 64 entry buffer one group advantageously handles entries no. 0 . . . 63, whereas the second group handles the virtual entries 64 . . . 127.

Further, the inventional principle of 'OR'ing subspaces or 'subgroups' followed by priority-selecting the results can be extended to cover more than being done once. Instead, this principle can be applied multiply in series. Thus, the inventional method is continuously scalable in order to be perfectly adapted to cover larger numbers of entries, i.e., several hundreds if required out of any architectural point of view.

Additionally, and according to a second aspect of the present invention the proposed implementation scheme can be easily extended to cover serialization which is of primary interest in any IWB implementation. According to the invention, serialization is integrated into the overall filter implementation to overcome a special external logic. This is done summarized as follows: An active window bit awb exists for each entry which is used for indicating the status of the entry—to be occupied or free to be rewritten, as it is proposed in U.S. Pat. No. 5,923,900, which is incorporated herein by reference.

First the active window bit string awb is OR-ed with the valid bit string vb indicating that an entry is ready for issue and the execution bit string ebn indicating that an entry is not yet issued what results into the so called effective valid bit string evb.

According to the present invention, the evb bit string is 'OR-ed' with a serialization bit string F-flag bits which are switched ON when the associated instruction has to be executed prior to any other following younger instruction, or switched OFF in the regular case of non-serialization. The 'OR'ing is done at the priority filter input which was mentioned above already. Thereby, each entry which has EVB ON or serialized is marked 'active' for the filter and can thereby be selected. Whereas the entries after the serialized one cannot be executed because they are younger. This guarantees that the younger ones can only be selected after the serialized instruction is finished.

The serialized instruction is active for the filter even if the evb bit is not. To prevent that this entry is selected and sent to the execution unit, an additional 'AND' of the filter output and the evb bit is needed. Thus the instruction can only be executed if said evb valid bit and the serialization bit are both switched ON, i.e., active. After the serialized instruction is executed a control logic resets F—for example, when the instruction is committed—and allows all following instructions to be executed. This integration into the filter requires two additional stages only. It has thus a small performance impact on the total priority filter delay.

Figure 1:
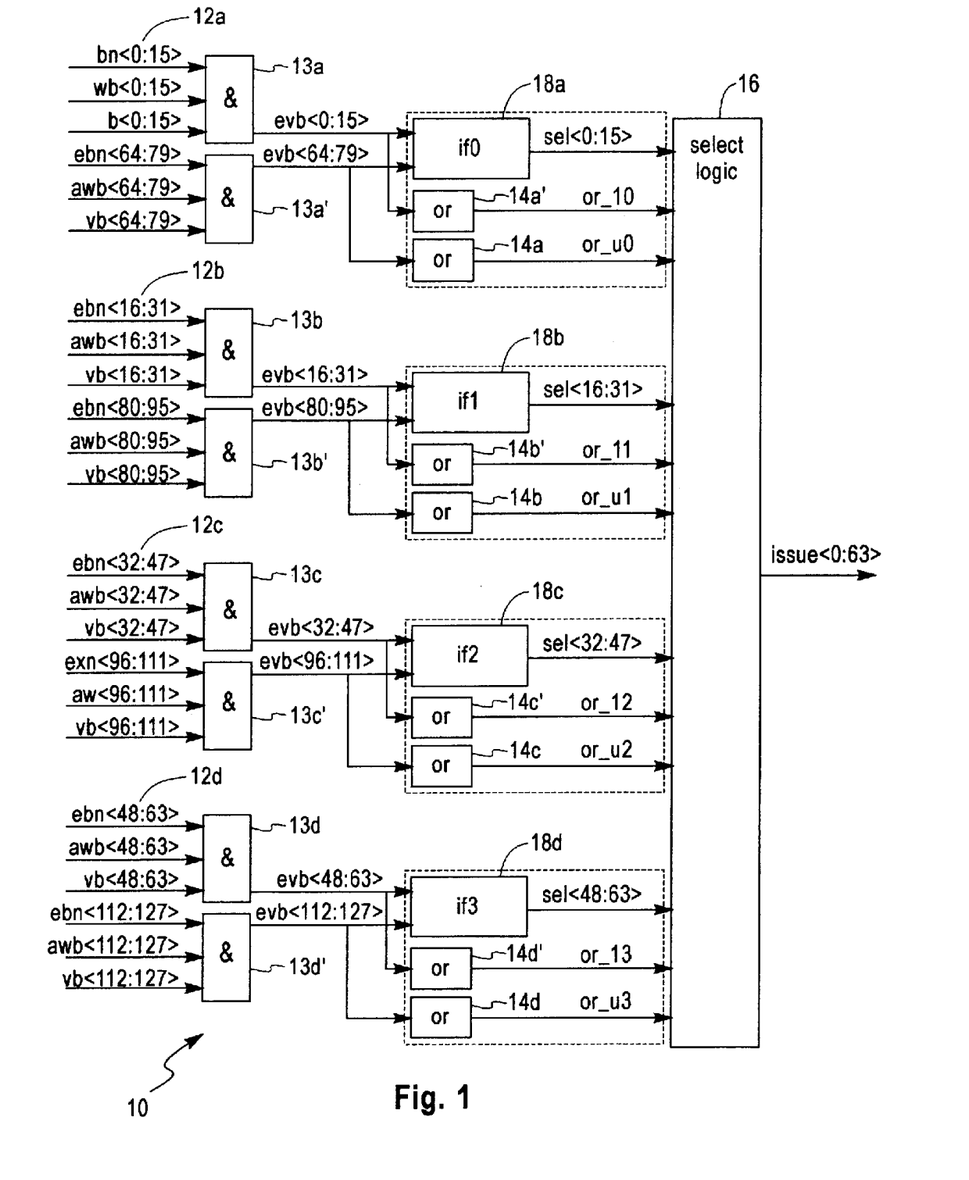
FIG. 1 is a block diagram showing the essential logic circuits used in a preferred embodiment of the priority filter applied to operate with an instruction window buffer (IWB) and based on creating 4 subgroups and covering the wrap-around case.

Referring to FIG. 1, an instruction window buffer denoted as a whole with reference sign 10 exemplarily has 64 entries, i.e., entries 0 . . . 63. The buffer is logically divided into four sub-windows 12a, 12b, 12c, 12d. The entries themselves and their contents are not of primary interest for the present invention and are thus not depicted in the drawing.

Each sub-window 12 is observed by small filters with the unfolded valid bit vector of the sub-window as input in order to cover the wrap-around case. Unfolding the valid bit vector results in managing 128 instead of 64 storage locations as is well known in prior art. In case of not covering wrap-around only 64 storage locations would have to be managed in total.

In order to properly work on the entries for the purpose of out-of-order execution three different flag bits are used for each entry:ebn-bit: Switched ON when the instruction is stored, i.e., written into the IWB, thereby becoming part of the active window of the IWB, or when it has to be reissued to an execution unit (IEU), switched OFF when it has been issued to an execution unit. awb-bit: Switched ON when the instruction is stored into the IWB thereby becoming part of the active window of the IWB, switched OFF when the instruction is removed from the IWB by the commit process. vb-bit: Switched ON when all source data is available for the instruction, switched OFF when source data is not available. The bits constitute a bit string control vector which is depicted at the left margin of the drawing in four groups, each group consisting of a pair one part covering the regular case—indexes 0 . . . 63, and the other part covering wrap-around with indexes 64 . . . 127. To be selected an instruction has to be valid (vb=1), inside the active window (awb=1) and not yet been executed (abn=1). The output bit strings ebn<0 . . . 127>, awb<0 . . . 127> and vb<0 . . . 127>, AND gates (13a, 13a', 13b, 13b', 13c, 13c', 13d, 13d'), define the effective valid bit string evb<0 . . . 127>.

According to the an embodiment of the invention, a number of four issue subfilters (18a, 18b, 18c, 18d) labeled as if0 . . . if3 are connected for reading the bit string vector mentioned above as an input and for outputting a select signal "bit switched ON" in the select bit vector—which specifies the oldest entry for an input into a post-connected select logic 16. The select logic 16 selects the oldest subgroup by acting as a switch that only transfers the oldest subgroup to the issue bit vector and switches the bits of all other subgroups OFF as will be described in more detail later on.

The issue filters (if0, if1, if2, if3) act as subfilters on disjunct subsets of the total of entries of the IWB and thus observe the bit string of the entries of the IWB. In particular, if0 works on evb(0 . . . 15,64 . . . 79), if1 on evb(16 . . . 31, 80 . . . 95), if2 on evb (32 . . . 47,96 . . . 111), and if3 on evb(48 . . . 63,112 . . . 127).

Each filter (if0 . . . if3) selects the oldest valid entry in its associated data space and sets a select bit vector (sel). Due to the filter operation on a subgroup only one bit in the select bit vector "sel" generated by a filter is switched ON. This bit in the select vector switched ON corresponds to the oldest instruction waiting for issue in the subgroup. The select bit vectors are the inputs for the post-connected select logic that generates the issue vector<0 . . . 63>. The select vector sel<0 . . . 63>, as generated by the filters if0 . . . if3, is directly mapped onto the issue vector issue<0 . . . 63> such that only the bit switched ON for the subgroup representing the oldest instruction is switched on in the issue<0 . . . 63>. To make this selection, it must be known if a bit is switched ON for each subgroup and if it is turned on through evb<0 . . . 63> inputs of the filter or by evb<64 . . . 127> inputs of the filter.

This information is generated through two OR stages (14a, 14a', 14b, 14b', 14c, 14c', 14d, 14d') associated with each filter 18a–d. More precisely, each of the 4 subgroups comprises a pair of 'OR' stages, a first one denoted by index "_I," i.e., "or_I" acting for the lower data vector range 0 . . . 63, and "or_u" acting for the upper data vector 64 . . . 127. Thus, the second OR stage of said pair denoted as 14a, 14a' to 14d, 14d' is able to cover the wrap around case as it is responsive to an auxiliary notation of entries resulting from an unfolding of the entry sequence.

For example, bit or_I0 is switched ON when one of the lines evb<0 . . . 15> is ON by the OR stages with inputs evb<0 . . . 15>. Furthermore, or_u0 is switched ON when one of the lines evb<0 . . . 15> is ON by the OR stage as inputs evb<64 . . . 79>.

Basically, the OR stage comprises a connecting line, i.e., dotted 'OR' between the 16 members of each subgroup. When the lowest index evb on a respective input line is found switched ON then said connective line is discharged as a whole, i.e., the position of the oldest entry can be derived from the fact that the oldest entry has the lowest index. Thereby, it should be noted that the string evb is unfolded. The real IWB entries are evb[0 . . . 63]. During unfolding the virtual entries evb[64 . . . 127] are generated such that for the evb[0 . . . 127] string the older instructions are in front of all younger instructions. Thus, instruction in entry 0—wait for issue is indicated by evb<0>—is younger than the instruction in entry 1. So, for example, in the wrap-around case with the in-pointer at the third entry, the first and second entry are the youngest in the IWB, thus evb<0> is set to 0 and evb<1> is set to 0 but the virtual entries evb<64> and evb<65> are set to 1. Therefore, always the lowest index of evb<index> set to 1 corresponds to the oldest entry. For example, with the unfolded evb(0 . . . 127) bit string as an input, a lower range entry (or_I) is always older than an upper range entry (or_u), an if0 entry is older than an if1 entry, an if1 entry older than an if2 entry, and an if2 entry older than an if3 entry.

A special 'select logic' block 16 then decodes this information and finds the oldest entry out of all four selected entries of the sub-windows. This can be performed by a switch structure in which the states of the switches are controlled by the or_I and or_u signals such that the oldest subgroup is mapped onto the corresponding bits of the issue vector and all other bits are switched OFF, i.e., are set to 0.

When for example if0 and if3 both select in or_I, i.e., in the normal mode then the if0 entry is older than the if3 entry. Hence the select logic sets issue<0 . . . 15> equal to sel<0 . . . 15> and issue<16 . . . 63>="0 . . . 0".

Or, when if0 selects in or_u, and if3 selects in or_I-wrap-around case-then the if3 entry is older than the if0 entry. In this case the select logic sets issue<48 . . . 63> equal to sel<48 . . . 63> since this is the oldest subgroup with a bit switched ON and the other outputs of the select logic issue<0 . . . 47> are set to all zero.

When both, if0 and if3 both select in or_u wrap-around mode then the if0 entry is again older than the if3 entry.

Figure 2:
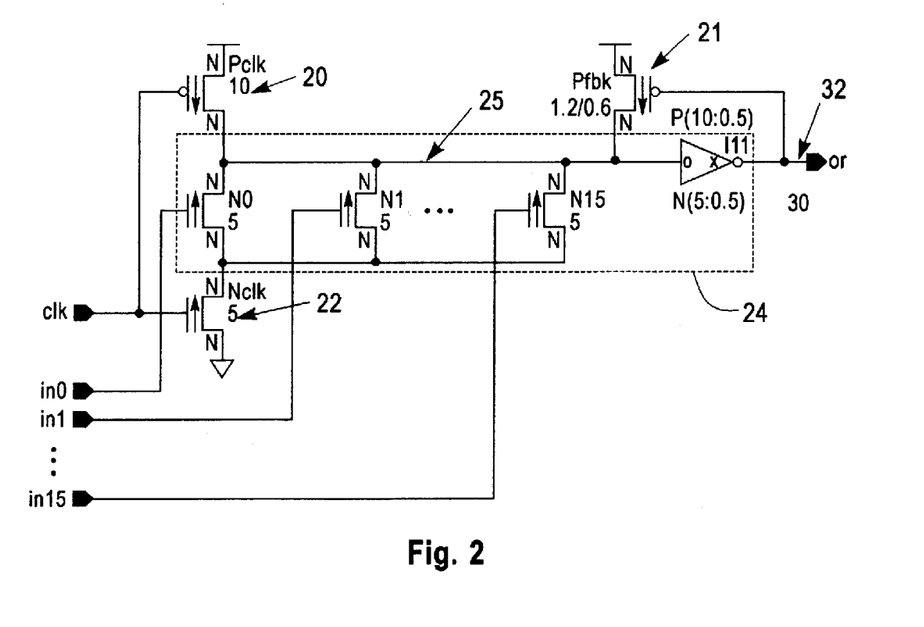
FIG. 2 is a schematic representation showing the function of the easy-to-implement dynamic 'OR' stages.

With reference to FIG. 2 the preferred 'OR' implementation using a dynamic 'dotted-or' structure will now be described.

When the clock (clk) input is low the "dotted" bit line 25 is precharged to high, i.e., to the supply voltage since the P transistor PFET 20 is switched ON and the N transistor NFET 22 is switched OFF when the input clk is low. This implies that the OR output signal 32 is low.

When the clock (clk) input is switched to ON, the evaluation phase starts and the output value will be set according to the logic OR function of the inputs in0 . . . 15. The logic OR function defines that the output OR remains low when all input in0 . . . 15 are low. When all inputs in0 . . . 15 are low all the N transistors NFET in the dotted box 24 will be OFF and the bit line 25 will remain high. Hence, the output 32 will remain low due to the inverter 30 between the bit line 25 and the OR output. Leakage currents during the evaluation phase are compensated for by the P transistor PFET 21 switched ON.

When at least one of the inputs in0 . . . 15 is high, the bit line 25 is set to low, since the NFETs in the dotted box 24 that are connected to the input in0 . . . 15 that are high will be switched ON and the NFET 22 that is controlled by the clk input is switched ON. When the bit line 25 is low the inverting device 30 will set the OR output to high as is required for the OR function.

Basically the same bit line structure with the dotted NFETs is found in the priority filter for suppressing the selection of a younger instruction in a subgroup for issue. Therefore, such a dynamic OR can be fully integrated into a priority filter if0 . . . if3.

Figure 3:
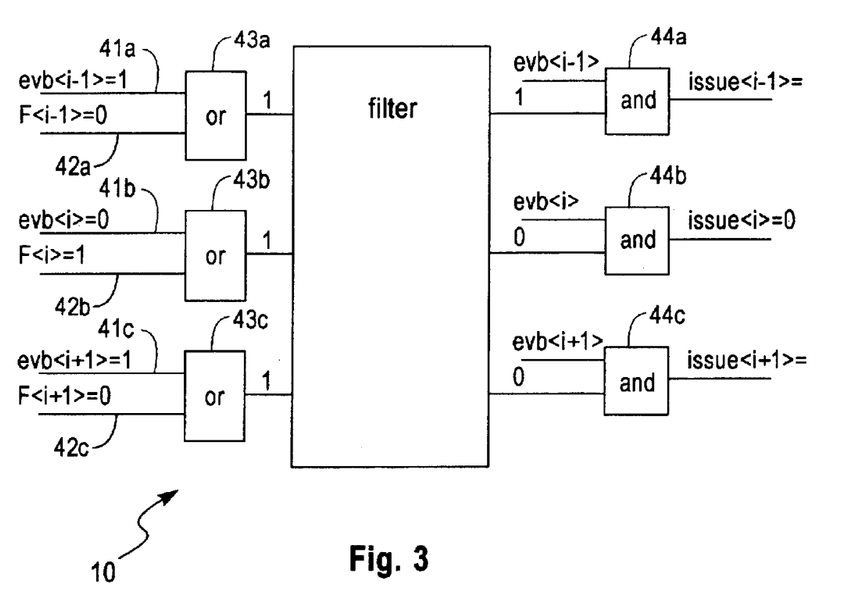
FIG. 3 is a block diagram showing the operation of a priority filter in accordance with the present invention with entries (i−1) and (i+1) valid, and entry (i) serialized.

With reference now to FIGS. 3, 4, 5 and 6 the operation of the inventional priority filter with integrated serialization in a sequence of four different situations will be described next, starting with a particular situation in FIG. 3 and developing further due to processor operation.

FIGS. 3, 4, 5 and 6 all have the same structure. Hence, the circuit is illustrated is a portion of the priority filter 10 comprising three of 64 outputs from the IWB which serve for reading the effective value bit evb via a respective line 41a, b, c, and the serialization bit denoted as F via a line 42a, b, c. When F is ON with a particular instruction then the instruction has to be executed in-order instead of out-of-order.

An additional 'OR' stage (43a, 43b, 43c) receives said lines 41 and 42 as input. Its output is connected as an input to a respective one of the subfilters if0, . . . if3. At the filter 10 output an additional 'AND' stage (44a, 44b, 44c) is connected to receive the filter output signal as described above and second, the evb signal, generated by ANDing ebn, awb, and vb—see back to FIG. 1.

The arrangement works in the following manner: The evb signal of each entry is 'OR'ed with the serialization bit F at the filter input. Thereby, each entry which is valid or serialized is active for the filter and can thereby be selected. No entries after the serialized one can be executed because they are younger. This measure guarantees that the younger instructions can only be selected for issue to execution after the F<i> input of the serialized instruction has been set to 0 by, for example, the commit process.

The serialized instruction is active for the filter, however, even if the valid bit is not active, i.e., when it is switched OFF. Then, of course, the entry must not be selectable. To prevent that this entry is selected and is sent to the execution unit, the additional 'AND' stage 44a, b, c of the filter output and the evb bit works in order to let the instruction only be executed if said evb and said serialization bit F are both active at a time.

So, beginning with FIG. 3 entry (i−1) and entry (i+1) are valid, but entry i is serialized. Thus, all entries are valid for the filter. Entry (i−1) is identified as oldest one and is selected for issue.

Figure 4:
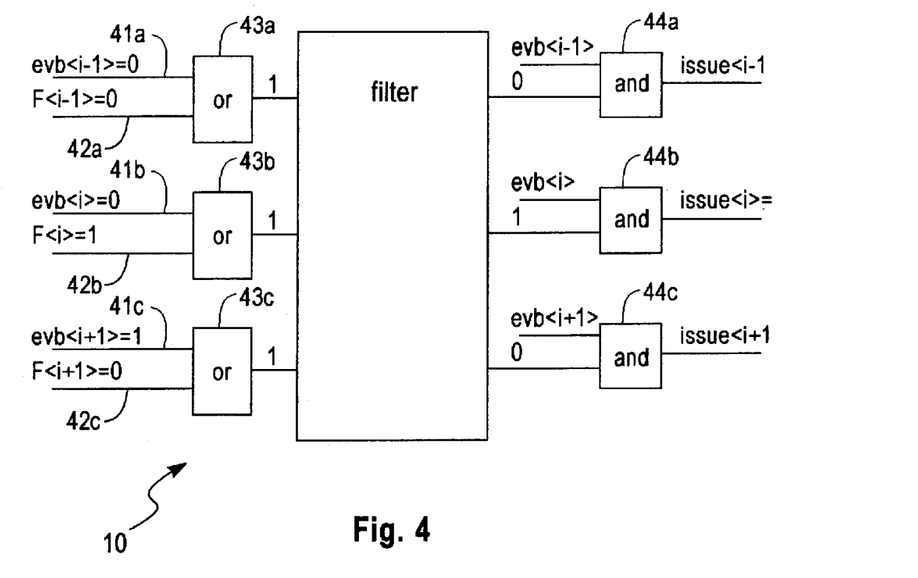
FIG. 4 is a block diagram showing the operation of the priority filter in accordance with the present invention with entry (i−1) executed, entry (i) invalid and serialized, and entry (i+1) valid but not selected.

In FIG. 4 entry (i−1)'s execution is finished, evb(i−1) is overwritten to zero due to ebn, see FIG. 1. Entry i is not valid and is serialized. Thus, it is selected but stopped at the output stage. Entry (i+1) is valid but not selected due to serialization.

Figure 5:
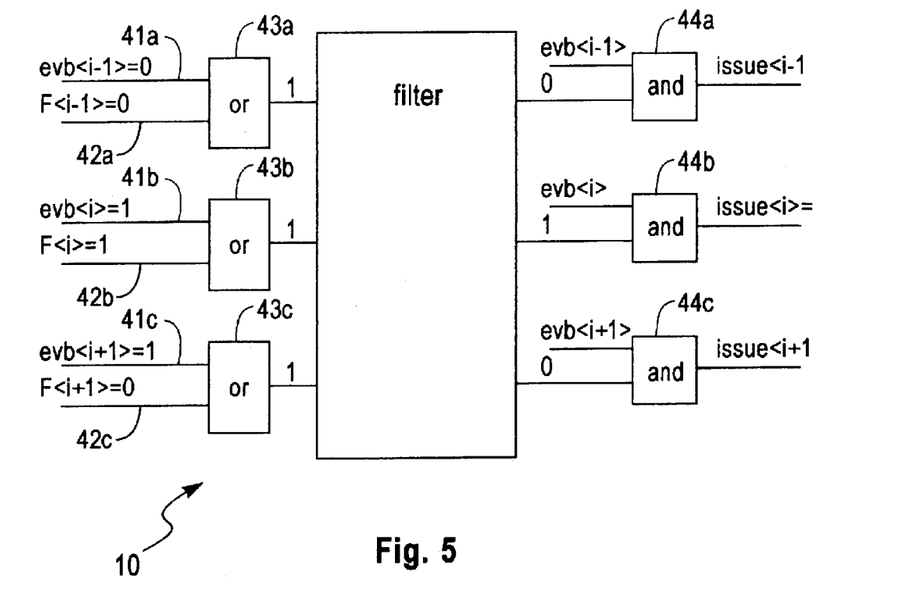
FIG. 5 is a block diagram showing the operation of the priority filter in accordance with the present invention with entry (i) valid and serialized.

In FIG. 5 entry (i) is valid and serialized. Thus, it is selected for issue. Entry (i+1) is younger than entry (i) and is not selected.

After the serialized instruction is executed a control logic not depicted explicitly resets F to OFF and allows all following instructions to be executed.

Figure 6:
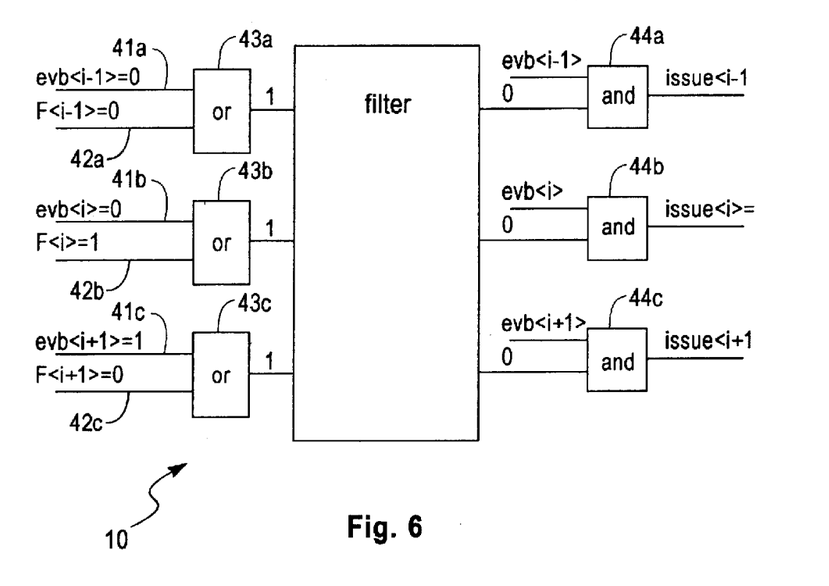
FIG. 6 is a block diagram showing the operation of the priority filter in accordance with the present invention with entry (i+1) selected for issue.

In FIG. 6 entry (i)'s execution is finished. Thus, the serialization bit F(i) and the valid bit evb(i) are overwritten to zero. Thus, entry (i+1) is selected for issue.

Due to the quite general nature of the present invention it can be applied in whatever queue management system and is explicitly not restricted to the FIFO principle. The inventional method and system can be applied to any other priority criterion, as long as the priority can be sensed by reading any bit of the entries or by evaluating any other criterion.

Further, the number of subgroups, i.e., subspaces may be varied as required by the current system architecture requirements.

Finally, a routing network can profit from the inventional method because the priority arbitration can advantageously be done with it.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

What is claimed is:

1. A method for determining the entry with the highest priority in a buffer memory, the method comprising:

operating a plurality of priority subtilter circuits each of them covering a subgroup of buffer entries and each selecting the entry with the highest subgroup priority;

selecting the entry associated with the highest priority subgroup; and using a "OR" stage in each priority subfilter circuit responsive to an auxiliary notation of entries resulting from an unfolding of the entry sequence.

2. The method according to claim 1, further comprises the step of selecting the entry with the highest priority with an "OR" type logic stage.

3. The method according to claim 1, further comprises the step of storing processing instructions in each of the entries.

4. The method according to claim 2, further comprising the step of using a dynamic OR stage for the "OR" type logic steps.

5. A method for determining an entry with the highest priority in a buffer memory, the method comprising:

operating a plurality of priority subfilter circuits each of them covering a subgroup of buffer entries and each selecting the entry with the highest subgroup priority;

selecting the entry associated with the highest priority subgroup; and serializing the entries by "OR"ing the effective valid bit of each entry with a serialization bit prior to said filter operation and "AND"ing said valid bit with the filter output.

6. The method according to claim 1, further comprises the step of using the above steps for performing the priority arbitration of a routing network.

7. A storage device which is able to be allocated and deallocated repeatedly during processing program instructions in a computer system, the storage device comprising:

issue filters operating a plurality of priority subfilter circuits each of them covering a subgroup of buffer entries and each selecting the entry with the highest subgroup priority;

a select block for selecting the entry associated with the highest priority subgroup;

a first dynamic "OR" type logical stage for selecting the entry with the highest priority; and a second "OR" stage in each priority subfilter circuit responsive to an auxiliary notation of entries resulting from an unfolding of the entry sequence.

8. A storage device able to be allocated and deallocated repeatedly during processing program instructions in a computer system, the storage device comprising:

issue filters operating a plurality of priority subfilter circuits each of them covering a subgroup of buffer entries and each selecting the entry with the highest subgroup priority;

a select block for selecting the entry associated with the highest priority subgroup; and a first logic device for "OR"ing an effective valid bit of each entry with a serialization bit prior to said filter operation and a second logic device for "AND"ing said effective valid bit with the filter output.

9. The storage device according to claim 7, wherein said storage device is used as circulating buffer.

10. The storage device according to claim 7, wherein said storage device is used as instruction window buffer.

11. A sub-unit for use in microprocessor devices having at least one storage apparatus, wherein the storage apparatus comprising a storage device which is able to be allocated and deallocated repeatedly during processing program instructions in a computer system, the sub-unit comprising:

issue filters for operating a plurality of priority subfilter circuits each of them covering a subgroup of the total of entries and each selecting the entry with the highest subgroup priority;

a select block for selecting the entry associated with the highest priority subgroup;

a first dynamic "OR" type logical stage for selecting the entry with the highest priority; and a second "OR" stage in each priority subfilter circuit responsive to an auxiliary notation of entries resulting from an unfolding of the entry sequence.

12. A microprocessor device having at least one sub-unit and the sub-unit having at least one storage apparatus, wherein the storage apparatus comprising a storage device which is able to be allocated and deallocated repeatedly during processing program instructions in a computer system, the microprocessor device comprising:

issue filters for operating a plurality of priority subfilter circuits each of them covering a subgroup of buffer entries and each selecting the entry with the highest subgroup priority;

a select block for selecting the entry associated with the highest priority subgroup;

a first dynamic "OR" type logical stage for selecting the entry with the highest priority; and a second "OR" stage in each priority subfilter circuit responsive to an auxiliary notation of entries resulting from an unfolding of the entry sequence.

13. A computer system having a microprocessor device, contained within the microprocessor device is at least one sub-unit, associated with the sub-unit is at least one storage apparatus, wherein the storage apparatus comprising a storage device which is able to be allocated and deallocated repeatedly during processing program instructions in a computer system, the computer system comprising:

issue filters for operating a plurality of priority subfilter circuits each of them covering a subgroup of buffer entries and each selecting the entry with the highest subgroup priority;

a select block for selecting the entry associated with the highest priority subgroup;

a first dynamic "OR" type logical stage for selecting the entry with the highest priority; and a second "OR" stage in each priority subfilter circuit responsive to an auxiliary notation of entries resulting from an unfolding of the entry sequence.

14. A circulating buffer comprising a storage device which is able to be allocated and deallocated repeatedly during processing program instructions in a computer system, the circulating buffer comprising:

issue filters for operating a plurality of priority subfilter circuits each of them covering a subgroup of buffer entries and each selecting the entry with the highest subgroup priority;

a select block for selecting the entry associated with the highest priority subgroup;

a first dynamic "OR" type logical stage for selecting the entry with the highest priority; and a second "OR" stage in each priority subfilter circuit responsive to an auxiliary notation of entries resulting from an unfolding of the entry sequence.

15. An instruction window buffer comprising a storage device which is able to be allocated and deallocated repeatedly during processing program instructions in a computer system, the instruction window buffer comprising:

issue filters for operating a plurality of priority subfilter circuits each of them covering a subgroup of buffer entries and each selecting the entry with the highest subgroup priority;

a select block for selecting the entry associated with the highest priority subgroup;

a first dynamic "OR" type logical stage for selecting the entry with the highest priority; and a second "OR" staye in each priority subfilter circuit responsive to an auxiliary notation of entries resulting from an unfolding of the entry sequence.

* * * * *